US008004224B2

(12) United States Patent
Marchetto et al.

(10) Patent No.: US 8,004,224 B2
(45) Date of Patent: Aug. 23, 2011

(54) SAFETY DEVICE FOR ROLLER BLINDS, SUN, AWNINGS, GATES OR THE LIKE

(75) Inventors: Oscar Marchetto, Oderzo (IT); Sergio Tomasella, San Polo Di Piave (IT); Bruno Bortolan, Ponzano Veneto (IT)

(73) Assignee: Nice SpA, Oderzo (Treviso) (IT)

( * ) Notice: Subject to any disclaimer, the term of this patent is extended or adjusted under 35 U.S.C. 154(b) by 468 days.

(21) Appl. No.: 12/092,333

(22) PCT Filed: Nov. 7, 2006

(86) PCT No.: PCT/EP2006/068183

§ 371 (c)(1), (2), (4) Date: May 1, 2008

(87) PCT Pub. No.: WO2007/051865

PCT Pub. Date: May 10, 2007

(65) Prior Publication Data

US 2008/0257504 A1 Oct. 23, 2008

(30) Foreign Application Priority Data

Nov. 7, 2005 (IT) .............................. TV2005A0169

(51) Int. Cl.
*G05B 5/00* (2006.01)

(52) U.S. Cl. ......... 318/466; 318/445; 318/434; 160/311

(58) Field of Classification Search .................. 318/466, 318/445, 434
See application file for complete search history.

(56) References Cited

U.S. PATENT DOCUMENTS

| | | | |
|---|---|---|---|
| 4,577,437 | A | 3/1986 | Gionet et al. |
| 4,698,967 | A | 10/1987 | Longora |
| 4,851,746 | A | 7/1989 | Milke |
| 4,888,532 | A | 12/1989 | Josson |
| 4,894,952 | A | 1/1990 | Trett et al. |

(Continued)

FOREIGN PATENT DOCUMENTS

| | | |
|---|---|---|
| DE | 4445978 | 6/1996 |

(Continued)

OTHER PUBLICATIONS

International Search Report dated Mar. 20, 2007 from corresponding PCT/EP06/068183.

(Continued)

*Primary Examiner* — Walter Benson
*Assistant Examiner* — David S Luo
(74) *Attorney, Agent, or Firm* — Katten Muchin Rosenman LLP

(57) ABSTRACT

Method—and device for the implementation thereof intended to provide a protection system for barriers which are movable along an operating path and actuated by a motor, such as roller blinds, gates or the like, comprising the steps of connecting the barrier, with play, to a fixed part (30) so that the barrier is able to move independently of the action of the motor over a travel section (98); defining within the section (98) a set of safety positions corresponding to a safety position for the barrier; detecting along the travel section (98) the actual position of the barrier with respect to the fixed part (30); preventing or reversing the action of the motor and/or the movement of the barrier when the barrier, inside the travel section (98), does not have a position included within the set of safety positions.

25 Claims, 13 Drawing Sheets

U.S. PATENT DOCUMENTS

| | | | | |
|---|---|---|---|---|
| 4,967,083 | A | 10/1990 | Kornbrekke et al. | |
| 5,015,840 | A | 5/1991 | Blau | |
| 5,142,152 | A | 8/1992 | Boiucaner | |
| 5,198,974 | A * | 3/1993 | Orsat | 700/56 |
| 5,285,136 | A | 2/1994 | Duhame | |
| 5,373,664 | A | 12/1994 | Butler | |
| 5,581,944 | A | 12/1996 | Kornbrekke et al. | |
| 5,583,334 | A | 12/1996 | Baumann | |
| 5,596,840 | A | 1/1997 | Teich | |
| 5,801,376 | A | 9/1998 | Haberi et al. | |
| 5,828,302 | A | 10/1998 | Tsutsumi et al. | |
| 5,963,000 | A | 10/1999 | Tsutsumi et al. | |
| 6,032,415 | A * | 3/2000 | Tajima | 49/28 |
| 6,092,338 | A | 7/2000 | Crowner et al. | |
| 6,167,991 | B1 | 1/2001 | Full et al. | |
| 6,181,095 | B1 | 1/2001 | Telmet | |
| 6,215,265 | B1 * | 4/2001 | Wolfer et al. | 318/434 |
| 6,243,006 | B1 * | 6/2001 | Rejc et al. | 340/436 |
| 6,247,558 | B1 | 6/2001 | Bailey et al. | |
| 6,279,687 | B1 | 8/2001 | Pusteiniak et al. | |
| 6,329,774 | B1 | 12/2001 | Ariav | |
| 6,678,999 | B2 | 1/2004 | Zengguang et al. | |
| 6,750,441 | B2 | 6/2004 | Imahori et al. | |
| 6,772,559 | B1 * | 8/2004 | Bouamra et al. | 49/26 |
| 6,782,660 | B2 | 8/2004 | Takada et al. | |
| 6,914,401 | B2 | 7/2005 | Semelka | |
| 7,038,409 | B1 * | 5/2006 | Mullet | 318/280 |
| 7,109,677 | B1 | 9/2006 | Gagnon et al. | |
| 7,132,813 | B2 | 11/2006 | Gregori et al. | |
| 2003/0150164 | A1 | 8/2003 | Mehalshick et al. | |
| 2004/0187387 | A1 | 9/2004 | Hedrich | |
| 2007/0113481 | A1 | 5/2007 | Kato et al. | |
| 2009/0229183 | A1 | 9/2009 | Kamiya | |

FOREIGN PATENT DOCUMENTS

| | | |
|---|---|---|
| DE | 19610877 | 1/1997 |
| DE | 19706209 | 5/1998 |
| EP | 0497711 | 8/1992 |
| EP | 0 803 632 | 10/1997 |
| FR | 2721652 | 12/1995 |
| FR | 2790787 | 9/2000 |

OTHER PUBLICATIONS

International Preliminary Report of Patentability Feb. 25, 2008 from corresponding PCT/EP06/068183.
International Search Report, dated Feb. 23, 2006, from corresponding International Application No. PCT/EP2005/055722.
Chinese First Office Action, dated Dec. 26, 2008, from corresponding Chinese Application No. 200580038407.2.

* cited by examiner

SAFETY DEVICE FOR ROLLER BLINDS, SUN, AWNINGS, GATES OR THE LIKE

CROSS-REFERENCE TO RELATED APPLICATIONS

This application claims priority to International Application PCT/EP/2006/068183, which was filed Nov. 7, 2006. This application claims priority to Italian Application TV2005A000169 filed Nov. 7, 2005.

BACKGROUND OF THE INVENTION

1. Field of the Invention

The invention relates to a method and a device providing a safety system for roller blinds, sun awnings, gates and the like.

2. Description of the Related Art

It is known that the actuating systems for roller blinds, to which reference will be made by way of example although the invention is also applicable to other movable barriers, are provided with safety devices for detecting when the roller blind, during its movement—especially its downwards movement—strikes an obstacle. After making impact, normally the roller blind is driven so as to reverse its direction of travel.

Many solutions of this type are known. In particular, a subassembly of such solutions makes use of a mechanical play existing between the drive shaft of the actuating system and the roller onto which the roller blind is wound. EP 0,552,459 describes an actuating system in which play is provided between two teeth projecting from the casing of the motor (of the actuating system) and a bar perpendicular to a rod fixed to the wall, which rod supports the entire actuating system. The bar is provided with deformation sensors for detecting the deformation thereof and therefore, indirectly, the load acting on the motor, from which data for controlling it is obtained.

EP 0,497,711 describes an actuating system in which a free wheel is arranged between the shaft and the roller. Two concentric members in the free wheel have, associated with them, means which act so that the relative movement of these two members when the free wheel starts to function after the roller blind strikes an obstacle causes, by means of a switch arranged in the electric power supply circuit of the motor, the automatic reversal of the direction of rotation of the roller and the immediate upward movement again of the roller blind.

FR 2,721,62 describes an actuating system where the roller is connected to a sensor, the signal of which representing the angular speed of the roller—here as below relative to the stationary part of the actuating system which is fixed to the wall—is processed by a logic unit in order to produce a stopped condition for the motor of the roller blind. A free wheel is provided, arranged between the motor and the roller, and zeroes the speed of the roller when it strikes an obstacle.

DE 196 10 877 describes a control system for an actuating system of roller blinds, comprising a pressure bar (Druckbalken). This bar is activated upon rotation of the motor which actuates the roller blind and, by means of the pressure sensors in contact with the bar, a signal is obtained and used to control the actuating system. In particular, this signal is used to detect an obstacle encountered by the roller blind.

DE 197 06 209 describes a system for measuring variations in weight acting on a roller which carries a roller blind, depending on which a motor-driven actuating system (of the roller blind) is controlled and in particular is stopped. In order to achieve this result a sensor in the form of a mechanical switching component is used, said component comprising two parts which co-operate and the relative angular position of which (along a same axis) is variable. When the roller blind reaches the end-of-travel stop or an obstacle, the relative rotation of the two parts changes and may be detected by mechanical switches so as to perform control of the actuating system.

U.S. Pat. No. 6,215,265 describes a system for controlling a motor-driven actuating system for a roller blind which measures the torque of the motor and stops it when it exceeds a fixed maximum torque value or following a maximum variation in the torque per unit of time. In addition, the speed of the roller is measured and the motor is stopped below a predefined speed value (which can be obtained from a stored profile). A further characteristic feature is to leave rotational play between the roller and the shaft of the motor, so as to make use of it as a further way of deactivating the motor. No further information is provided in this connection.

DE 44 45 978 relates to a safety device for roller blinds in which the stationary part of the actuating system is fixed with a certain degree of play, allowing a limited angular movement about the axis of the shaft (onto which the roller blind is wound) and in which at least one pivoting interrupt lever with an associated spring is provided. During a dangerous event the spring pulls the lever against a switch so as to produce a malfunction signal.

All these solutions have drawbacks.

The solutions which, in order to detect the presence of an obstacle, control the consumption or the load of the motor must necessarily rely upon a variation in the consumption or load produced by the obstacle. This variation, in order to activate a protection system, must exceed a minimum activation threshold below which it is still possible for dangerous impact situations to occur. Moreover, since the controlled (or monitored) component is the motor of the actuating system, the component which actually causes the impact, namely the roller blind, which sometimes has considerable dimensions, is not monitored. It is particularly difficult to control the motors which are fitted to roller blinds such as shutters, Venetian blinds or external roller shutters which have a “bellows” structure where the variation in load following an impact with an obstacle is difficult to predict because it depends on the obstacle itself and the impact conditions. In fact, it is the deformation of the roller blind during impact which produces the variation in the load on the motor. Moreover, since it is dependent upon the characteristics of the motor, each system must be set for the specific application, which varies greatly depending on whether it is required to operate shutters, awnings, blinds, doors or entranceways which have a varying size, weight and characteristics.

With the solutions which instead make use of mechanical play between the roller and motor, a degree of uncertainty may arise during their operation. When the play is used to obtain protection by means of a slider travelling along the entire length thereof in order to activate a switch or similar solutions, necessarily the play must be gauged in relation to the particular application. Too small a play may trigger protection without an obstacle actually being present, since the roller blind may encounter along its path not an insignificant amount of resistance, such as that produced by dust which has accumulated (especially with time) or ice formations, or may simply encounter more friction than predicted, usually as a result of an increase in dimensions due to variations in temperature which may even occur on a daily basis.

Too great a play may trigger the protection when the entire weight of the roller blind is already acting on the obstacle, which is very dangerous if, for example, the obstacle is a person.

It is therefore easy to appreciate the difficulty of designing a reliable system which has acceptable operating margins and at the same time can be used in more than one application, in order to reduce the re-designing and adaptation costs.

If the mechanical play is associated with control of the roller speed, here too the already mentioned problems exist of having to choose the degree of play with a compromise between efficiency and the possibility of standardisation. Where, however, there is only control of the angular speed of the roller, whether or not a free wheel is used on the roller, the risks exists that this speed may fall and trigger activation only when the roller blind is already bearing dangerously on the obstacle, something which is all the more likely where the roller blind has a fold-up structure (for example a blind with several horizontal slats) since the edge of the roller blind subject to impact disengages from the roller.

Where, instead, mechanical play is used to monitor indirectly the parameters of the motor, the general performance of the actuating system suffers from the drawbacks of the systems where only the parameters of the motor itself are monitored. In this case the mechanical play is nothing other than an alternative sensor for an electrical or physical characteristic of the motor.

SUMMARY OF THE INVENTION

The object of the present invention is to provide a protection device which is devoid of the drawbacks of the prior art.

This object is achieved with a method for providing a protection system for barriers which are movable along an operating path and actuated by a motor, such as roller blinds, gates or the like, comprising the steps of:

- connecting the barrier, with play, to a fixed part so that the barrier is able to move independently of the action of the motor over a travel section;
- defining within the section a set of safety positions corresponding to a safety position for the barrier;
- detecting along the travel section the actual position of the barrier with respect to the fixed part;
- preventing or reversing the action of the motor and/or the movement of the barrier when the barrier, inside the travel section, does not have a position included within the set of safety positions.

In order to implement this method, the invention envisages a protection device for movable barriers which can be actuated by a motor, such as roller blinds, gates or the like, for implementing the method, comprising:

- a part fixed with respect to the movement of the barrier;
- a kinematic chain by means of which the fixed part can be connected to the barrier with play, the barrier being able to move independently of the action of the motor over a travel section;
- detection means for detecting, along the travel section, the relative position of the fixed part and the barrier;
- a processing unit which acquires position data from the detection means and prevents or reverses the action of the motor and/or the movement of the barrier when the barrier, along the travel section, does not have a position included within a set of safety positions.

BRIEF DESCRIPTION OF THE DRAWING

The advantages of a method and a device according to the invention will emerge more clearly from the following description, which refers mainly, by way of example, to an actuating system for a roller blind, but the comments of which are applicable to any variant of the invention, and which refers to the accompanying drawings, where.

DETAILED DESCRIPTION OF THE INVENTION

Figure 1:
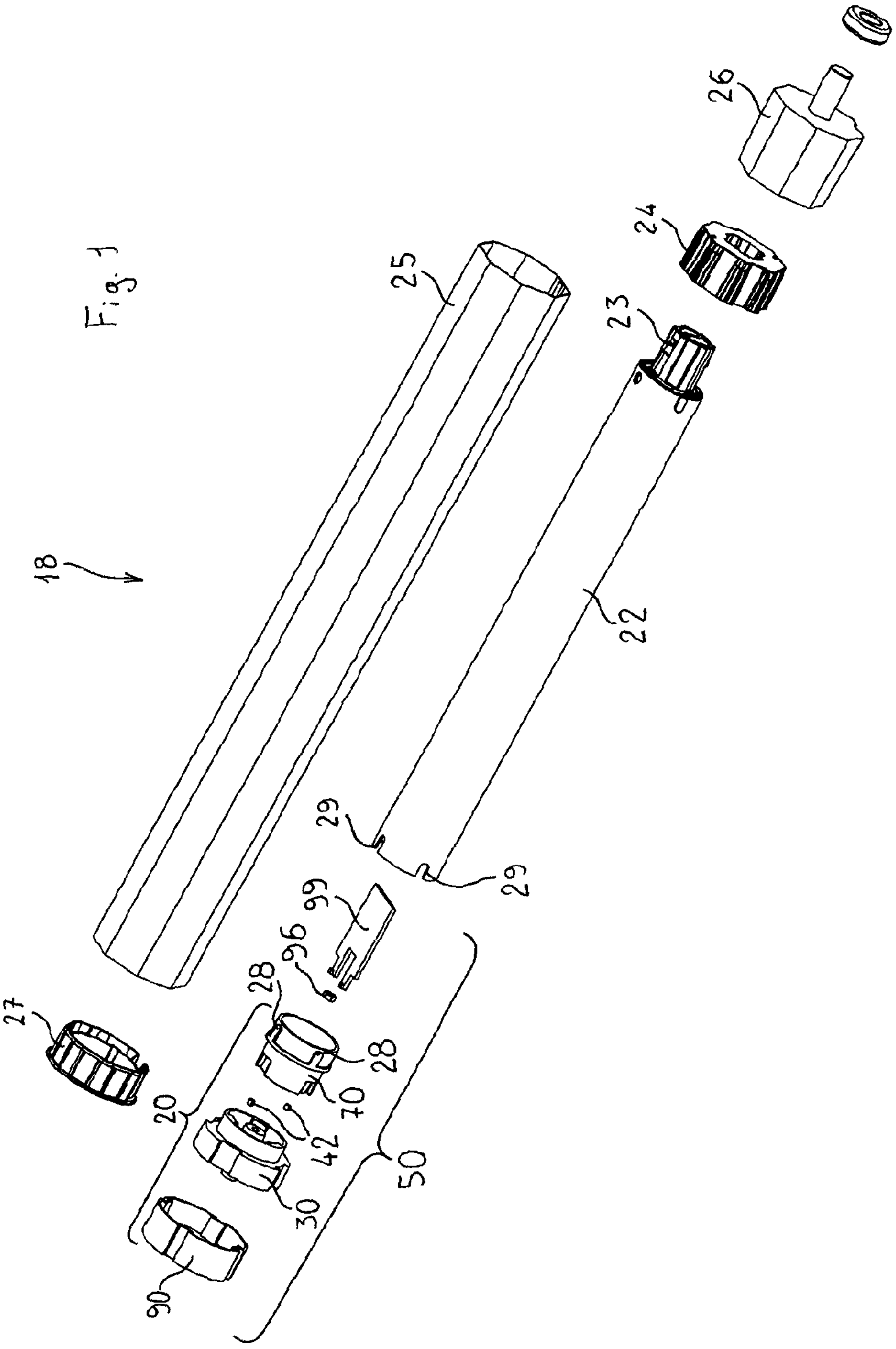
FIG. 1 is an exploded view of an actuating system for roller blinds.

In FIG. 1, 18 denotes an actuating system for roller blinds, composed of:

- a device 50 for implementing the method according to the invention, associated with an end group 20;
- a tubular body 22 which:
- at one end contains a motor and all the devices for operation thereof (not shown), the output shaft of which is connected to a pinion 23 inserted inside a toothed adaptor 24 for a roller 25 (on which the roller blind—not shown—is wound). The roller 25 is arranged over the tubular body 22 in a coaxial position;
- at the other end it is joined to a rotating part 70 by means of forced engagement between reliefs 28 on the rotating part 70 and corresponding recesses 29 of the tubular body 22;
- a prism-shaped support body 26 which is fixed rotatably to a wall and in which one end of the roller 25 is engaged, a metal ring 27 being inserted inside the other end of the roller 25.

Figure 2:
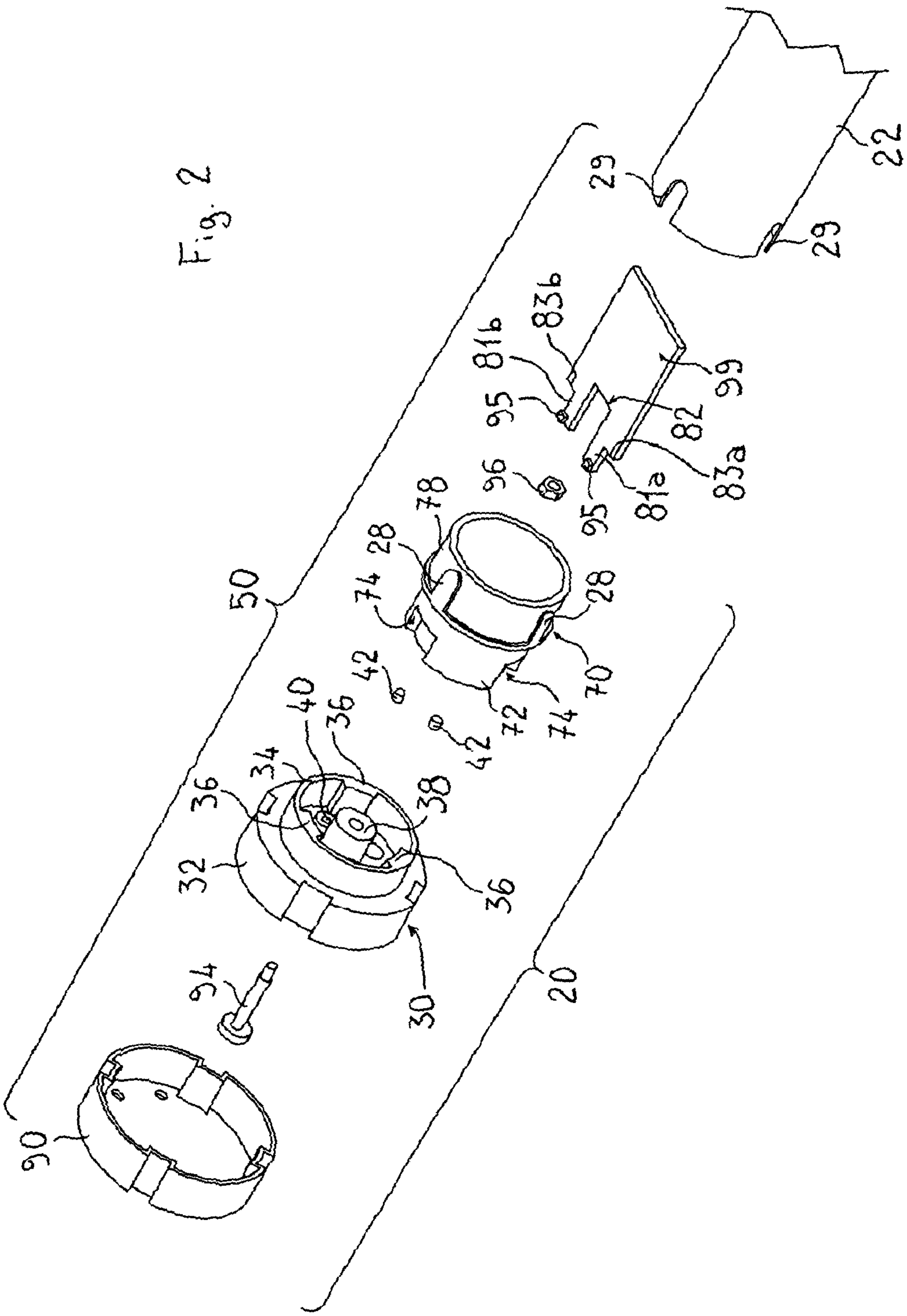
FIG. 2 is an exploded view of a device according to the invention.

The device according to the invention has been shown separately and in greater detail in FIG. 2. It comprises a base piece 30 and a rotating part 70 substantially with a circular cross-section, an electronic circuit board 99 and a wall bracket 90. The latter is fixed to a wall and the base piece 30 is housed inside it. The tubular body 22 is inserted inside the roller 25 of the roller blind.

The base piece 30 acts as a fixed base on which the rotating part 70 is able to rotate over a limited section of angular travel, the amplitude of which is defined by mutual mechanical play. For this purpose, the base piece 30 comprises a cylindrical base 32 from which there projects a circular lip 34 which has, on the inside, in a cavity 33, three identical teeth 36 which are situated in a relative 120° radial arrangement, with respect to the centre of the lip 34 where there is a hollow cylindrical relief 38 which is as high as the lip 32. Two identical circular seats 40 are situated at the bottom of the relief 38 and contain two identical magnets 42 with corresponding dimensions.

With a screw 94, tightened by a nut 96 which passes inside the relief 38, the base piece 30 is rotatably connected to the rotating part 70 which also has a circular lip 72, but with a diameter smaller than the lip 34 so as to be able to fit perfectly inside it and rotate with frictionless contact. The lip 72, opposite the teeth 36, is inset towards the centre, forming three identical concavities 74 with an arched bottom and width greater than that of the teeth 36 such that, when the rotating part 70 rotates relative to the base piece 30, the teeth 36 move inside the concavities 74.

The lip 72, in the region of a concavity 74, terminates in a shoulder 76 or continues directly with a circular edge 78 from the bottom surface 79 of which (see FIGS. 5 and 6) a hollow cylindrical spacer 80 projects centrally, inside which spacer the nut 96 and part of the body of the screw 94 are contained. By tightening the screw 94 not too tightly using the nut 96, the rotating part 70 rests against the relief 38 and is able to rotate inside the base piece 30 without becoming detached. The difference in width between the teeth 36 and the concavities 74 defines a limited angular section of travel (play)—denoted by 98—along which the rotating part 70 is able to travel inside the base piece 30.

Figure 3:
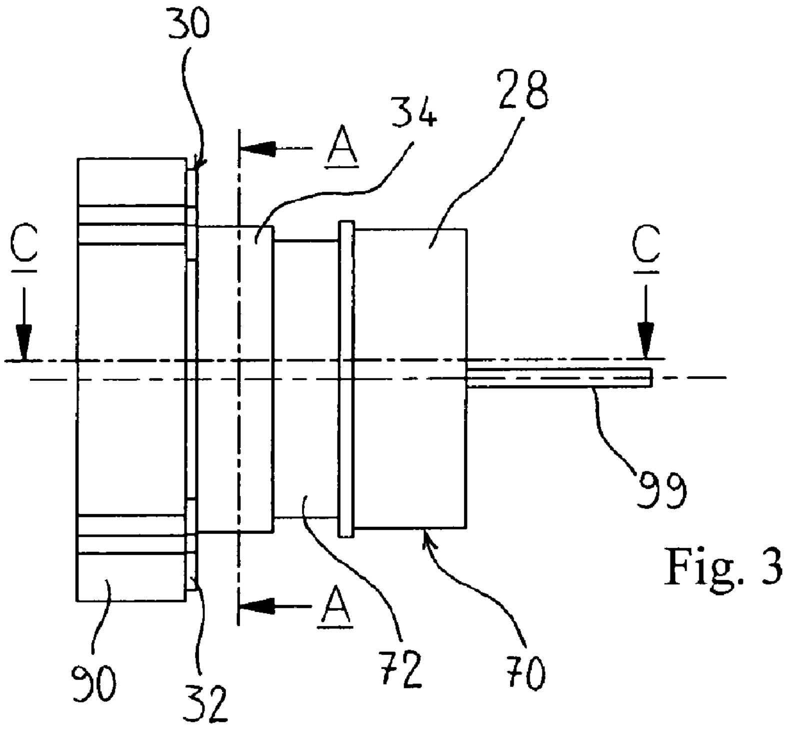
FIG. 3 is a side view of one end of the actuating system according to FIG. 1.
Figure 4:
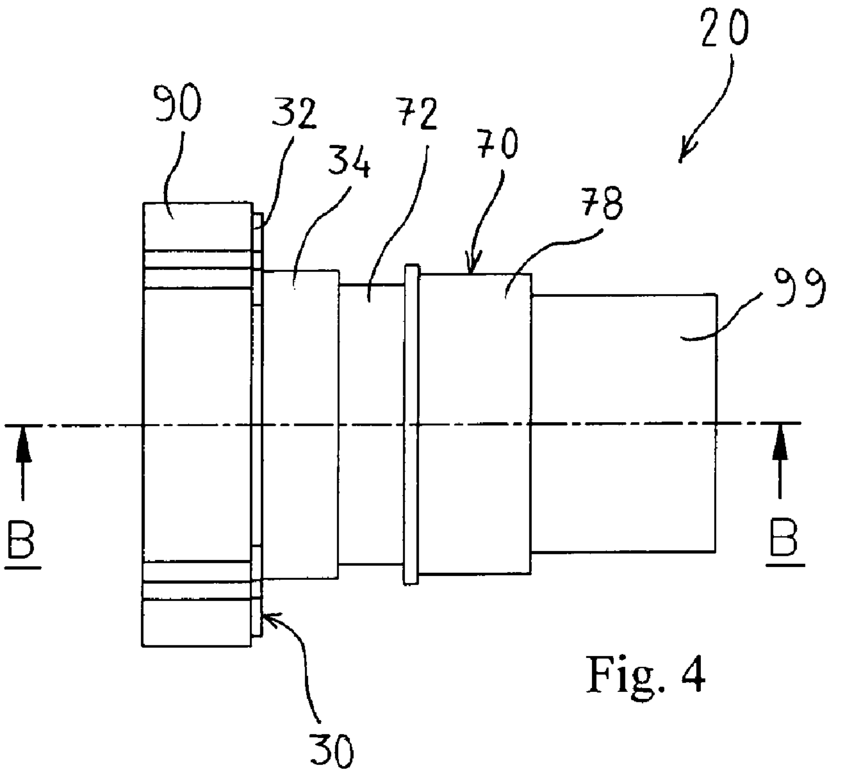
FIG. 4 is a top plan view of the end according to FIG. 3.
Figure 5:
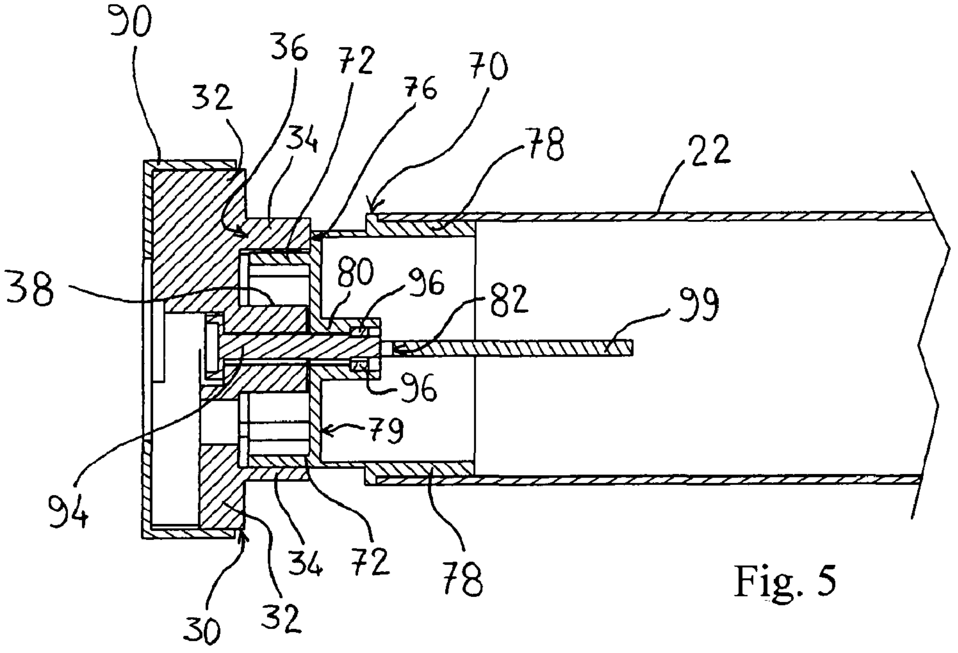
FIG. 5 is a cross-sectional view along the plane B-B indicated in FIG. 4-4.
Figure 6:
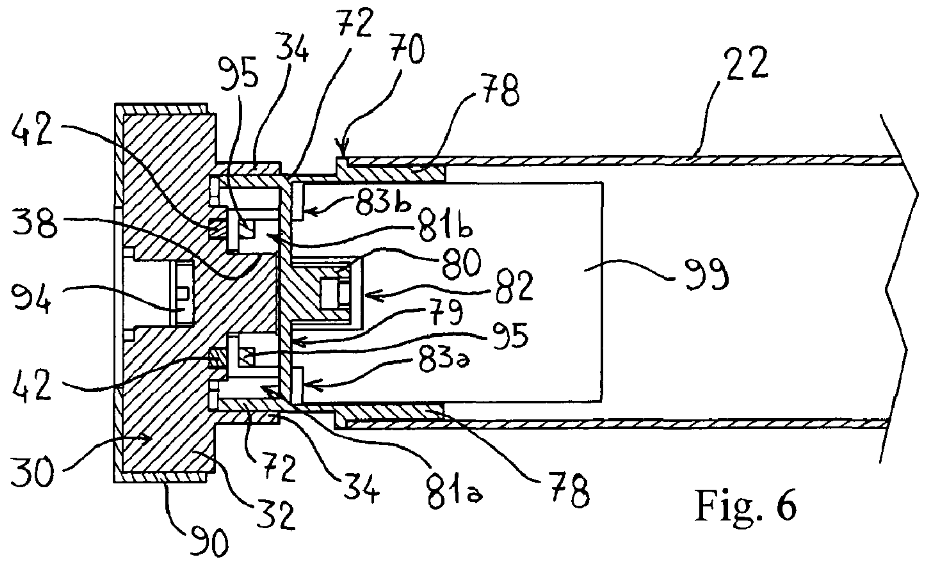
FIG. 6 is a cross-sectional view along the plane C-C indicated in FIG. 3.

The bottom surface 79 has a diametral slit (not shown) inside which the circuit board 99 (shown in schematic form) is inserted and retained by means of its fork-shaped end 82 with two sides 81*a*, 81*b*; therefore, the two sides 81*a,b* surround snugly the spacer 80 and extend beyond the bottom surface 79 into the space surrounded by the lip 34 (see FIGS. 5 and 6, where, in order to facilitate understanding thereof, the tubular body 22 not shown in FIGS. 3 and 4 is also cross-sectioned). The ends of the sides 81*a,b* each support a Hall sensor 95 which is positioned, once the board is inserted, opposite a magnet 42. It should be noted that the board 99 is shown in very schematic form, but contains all the logic components, the signal processing components and the connections necessary for the functions which will be described. Moreover, in order to increase the sensitivity of the system, the magnets 42 are directed so that a pole of their magnetic field is directed towards the sensors 95.

Advantageously, resilient means 97, for example a spring or rubber piece, may be inserted inside the section 98 so as to push resiliently the rotating part 70 into a zero reference angular position where each tooth 36 is situated approximately in a central position with respect to the width of the corresponding concavity 74 (see FIG. 7), which condition is achieved only when the actuating system for roller blinds 18 is not installed. After installation of the actuating system 18 and the roller blind, the position of the teeth 36 with respect to the corresponding concavity 74 is mainly the result of the simultaneous action of the weight force of the roller blind and the opposing force provided by the resilient means 97. Moreover, also present is the action of any friction or resistance which the roller blind encounters during its travel and which may in fact vary during the life of the roller blind and must be alternately added to or subtracted from the action of the weight force of the roller blind. By varying the resilience factor of the means 97 (or their size) it is possible to optimise the sensitivity of the system, preventing also false alarms or stray signals being emitted by the sensors 95.

Figure 7:
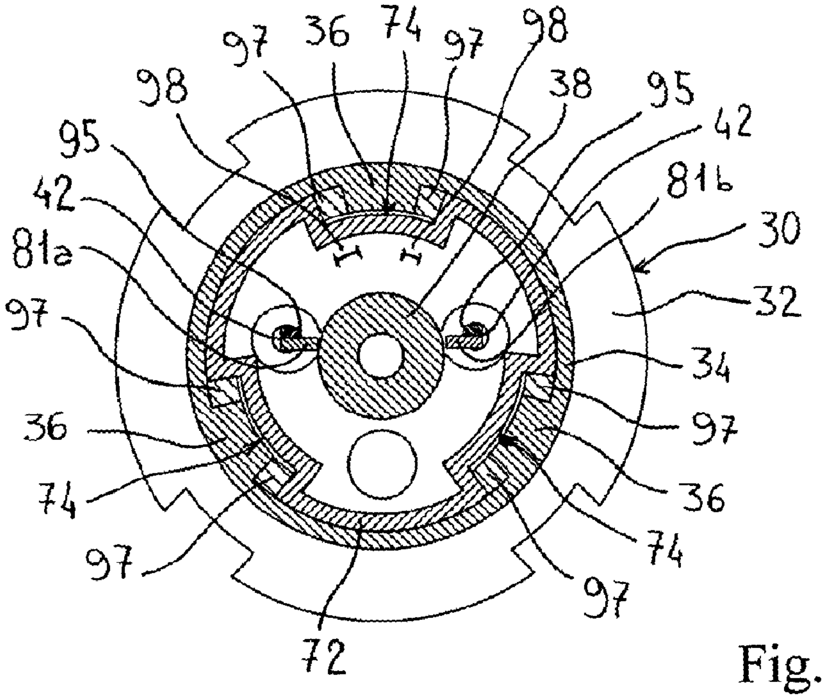
FIG. 7 is a cross-sectional view along the plane A-A of FIG. 3 in a first operating condition.
Figure 8:
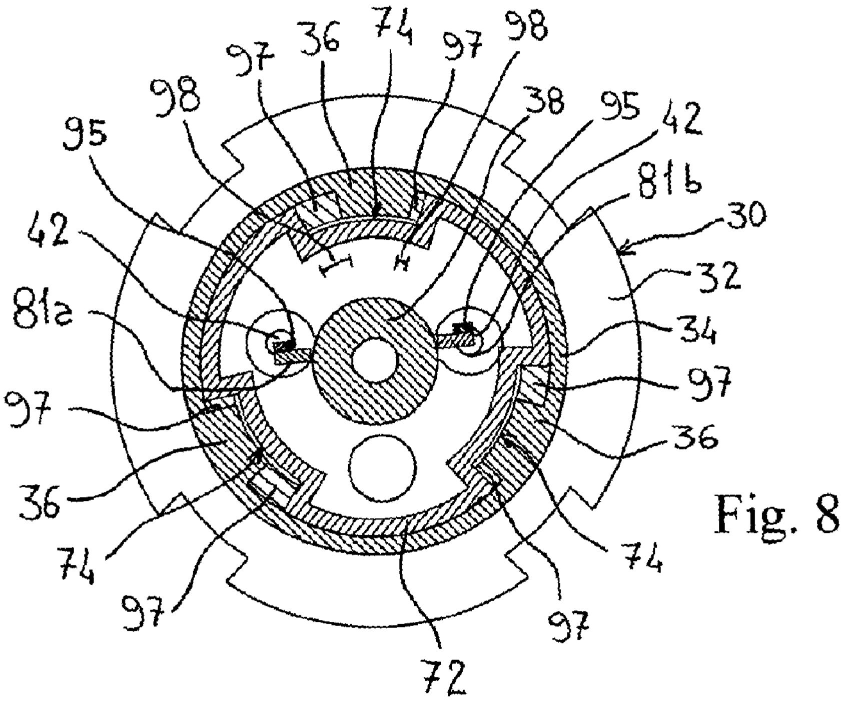
FIG. 8 is a cross-sectional view along the plane A-A of FIG. 3 in a second operating condition.
Figure 9:
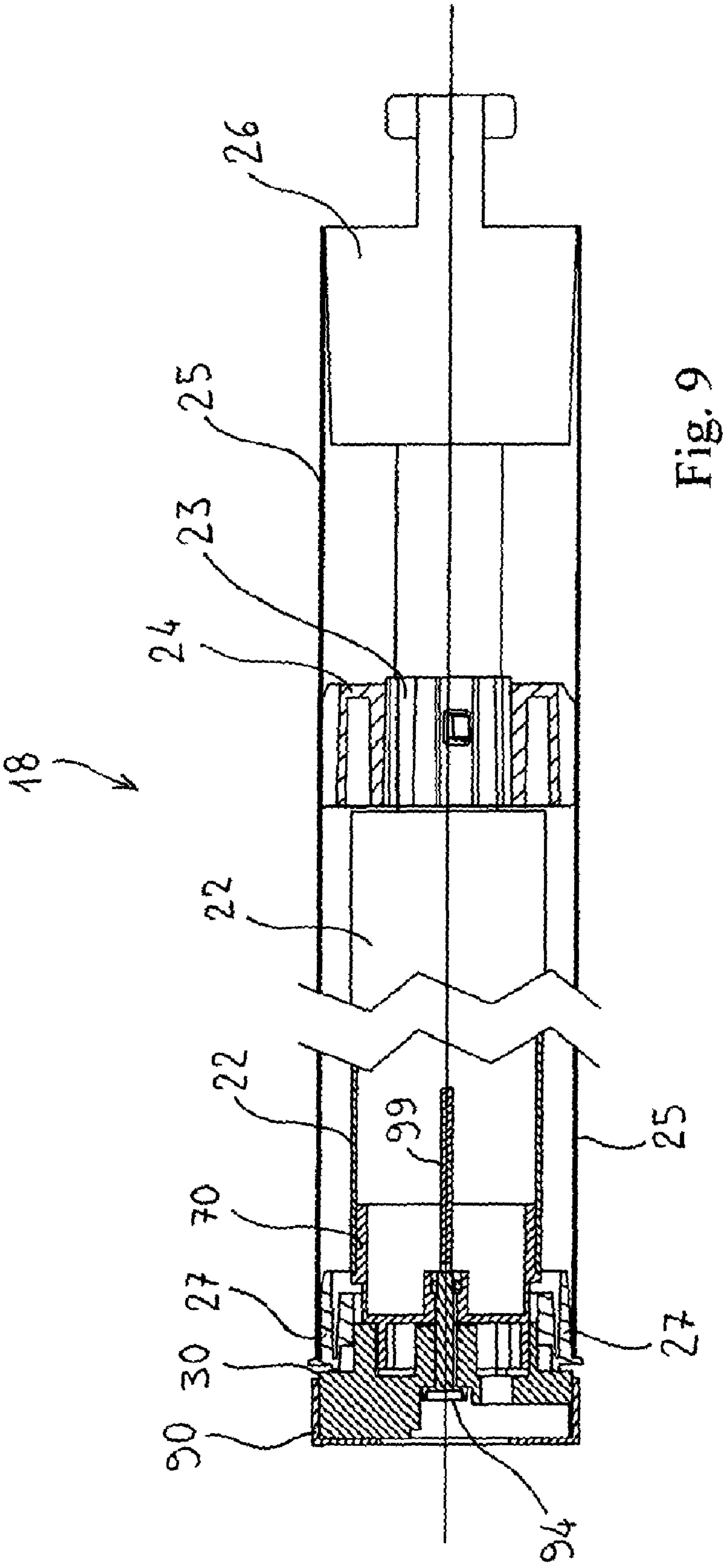
FIG. 9 is a vertically and longitudinally cross-sectioned view of the actuating system according to FIG. 1.

Operation of the device 50 is now described, with reference to FIGS. 7, 8 and 9.

The actuating system 18 comprises a kinematic chain consisting of the following components:

- the roller 25 is joined to the motor of the actuating system via the adaptor 24 and the pinion 23;
- the motor is joined to the tubular body 22 (being rigidly contained inside it) and the latter is joined to the rotating part 70.

During rotation of the roller 25, the roller blind is wound onto or unwound from the roller 25. The moment exerted by the weight of the roller blind on the roller 25 therefore varies and is transmitted via the kinematic chain to the rotating part 70, which assumes a certain angular reference position within the section of play 98. This position is the result of the action of the moment generated by the weight of the roller blind on the roller 25 and the opposing force of the resilient means 97 to which the moment of the motor is indirectly applied (the motor is controlled so as to rotate at a practically constant angular speed so as to move the roller blind at a constant speed).

If the roller blind encounters an obstacle and is stopped or in any case slowed down by it, the relative angular position of the rotating part 70 and base piece 30 varies and the sensors 95 detect instantaneously this variation. This is explained with reference to FIGS. 7 and 8 where two different angular positions of the rotating part 70 with respect to the base piece 30 are shown.

In the angular position of the rotating part 70 shown in FIG. 7, the two sensors 95 detect a strong magnetic field (resulting from the proximity to the magnets 42). When the rotating part 70 is rotated as shown in FIG. 8, the magnetic field in the space occupied by the sensors 95 is smaller, as is the signal output by the latter and analysed by the board 99. It is easy to understand that, in general, for each angle covered by the rotating part 70 within the section of play 98, the magnetic field detected by the sensors 95, and therefore their output signal, will be different and uniquely linked to the angular position of the rotating part 70 (suitable screening systems—not shown—prevent any interference from outside the system).

The board 99 processes the signal of the sensors 95 so as to extract the information relating to the angular position of the rotating part within the section 98. At the same time, the board 99 may also acquire the current position of the roller blind (detected, calculated or estimated by means of devices of the known type, usually encoders, associated directly with the motor, inside the tubular body 22, or with the roller 25).

During operation of the actuating system 18, when the roller blind is moving, it is possible to detect a signal which corresponds to the actual angular position of the rotating part 70 within the section 98. This signal may be sampled and stored so as to obtain a response curve (RC), namely a very compact sequence of data which correspond to the different positions occupied by the rotating part 70 within the play section 98. Each sample may be associated with a precise instant or with the actual position of the roller blind, during the movement of the latter along the operating path.

All this allows at least two advantageous operating modes to be obtained:

i) it is possible to define a set of safety positions consisting simply of a range of positions of the rotating part 70 within the play section 98. Each position outside this range is regarded as a danger signal and the actuating system is correspondingly controlled. Therefore the protection consists of operation which is of a "stepped" nature, but able to be adjusted with a programmable margin of freedom so as to take account of the tolerances during operation.

ii) at the time of installation, in order to adapt the actuating system 18 to the specific operating situation, or also afterwards, if it is considered that some operating conditions have varied considerably and it is necessary to re-configure the system, an actuating system which is fitted with the device 50 may perform an adaptation step during which:

- the roller blind completes one or more opening/closing cycles along the operating path;
- at the same time the relative angular deviation of the base piece 30 and the rotating part 70 is sampled, if necessary averaged and/or filtered and stored in a memory of the board 99. This thus produces a response curve (RC) for the angular deviation corresponding to the specific operating condition, in which the sampled data are associated with the position of the roller blind;
- a tolerance value T to be added to the RC is defined, in order to take account of small variations—which are not significant for safety purposes—associated in a variable and unpredictable manner with the path of the roller blind;
- subsequently the RC and the tolerance T are stored in a suitable non-volatile memory (not shown).

During subsequent operation of the actuating system 18, the current position of the roller blind along the operating path and the corresponding current relative angular deviation of rotating part 70 and base piece 30 are detected, the latter is compared with the point of RC+T (which corresponds to a set of safety positions) relating to the current position and, if the limits values for the tolerance T are exceeded, the board 99 activates protection, for example reversing the direction of rotation of the motor or causing stoppage thereof and activating a danger signal.

Advantageously it is possible to store a set of positions of the barrier along the operating path. In this way it is possible to associate, biunivocally, a set of safety positions with a set of positions of the barrier along the operating path, namely a plurality of points is considered along the operating path and a value of the angular deviation is associated with each of them in a set of safety positions. When the barrier reaches a point belonging to the predetermined set of positions along the operating path, the current angular deviation is compared with the corresponding value present in the set of safety positions, and action is taken consequently.

This self-learning procedure may be activated by the user or performed by the actuating system automatically at periodic intervals.

Another advantage of the invention is that by detecting continuously and point-by-point the relative angular deviation of base piece 30 and rotating part 70—this parameter indicating the resistance encountered by the roller blind along its travel path—it is possible to associate with different angular positions of the rotating part 70 within the section 98 one or more activation thresholds or different RC+T values within the memory, corresponding to different danger situations. These threshold values are not fixed, but may be established very easily in each case (configuring the electronic board 99, advantageously via software), depending on the application and the operating environment of the said application.

On the basis of different threshold or tolerance levels, which are programmed and stored in the electronic board, it is possible to determine, during installation, the behaviour mode of the system depending on the environment. For example, it is possible to establish a "level 1" (low sensitivity), where the tolerance T will be 20% since the roller blind is used in industrial applications, "level 2" where the tolerance T will be 15% since the roller blind is used on a window of a dwelling, "level 3" where the tolerance T will be 10% since the roller blind is used on French windows which are frequently used in a home, "level 4" (high sensitivity), where the tolerance T will be 5% since the roller blind is used in special environments such as nurseries or shops. Obviously, said levels may also be used for applications in particular climatic conditions, where ice is present or large variations in temperature frequently occur.

Therefore the mechanical characteristics of the device 50 do not change, even though its functional capabilities change, allowing it to be easily mass-produced. The capacity for adaptation of the device 50 to each operating situation of a roller blind, or even to changes—as a result of ageing or environmental variations—encountered during its movement, are effectively compensated for in real time. This may be performed either by the user, who may re-program the activation thresholds as desired, or automatically, using the self-learning procedure described.

The safety device 50 may also be battery-powered and/or provided with a wireless transmission system (for example of the radiofrequency, infrared or Bluetooth type) for signalling, advantageously to a remote receiver component, the danger condition or transmitting the angular deviation. Alternatively it is possible to envisage integrated network and/or fast connection means.

Obviously, in order to measure the relative angular displacement of the base piece 30 and rotating part 70, it is possible to use other transducers, such as a potentiometer, an optical system, an additional encoder, etc.

Figure 10:
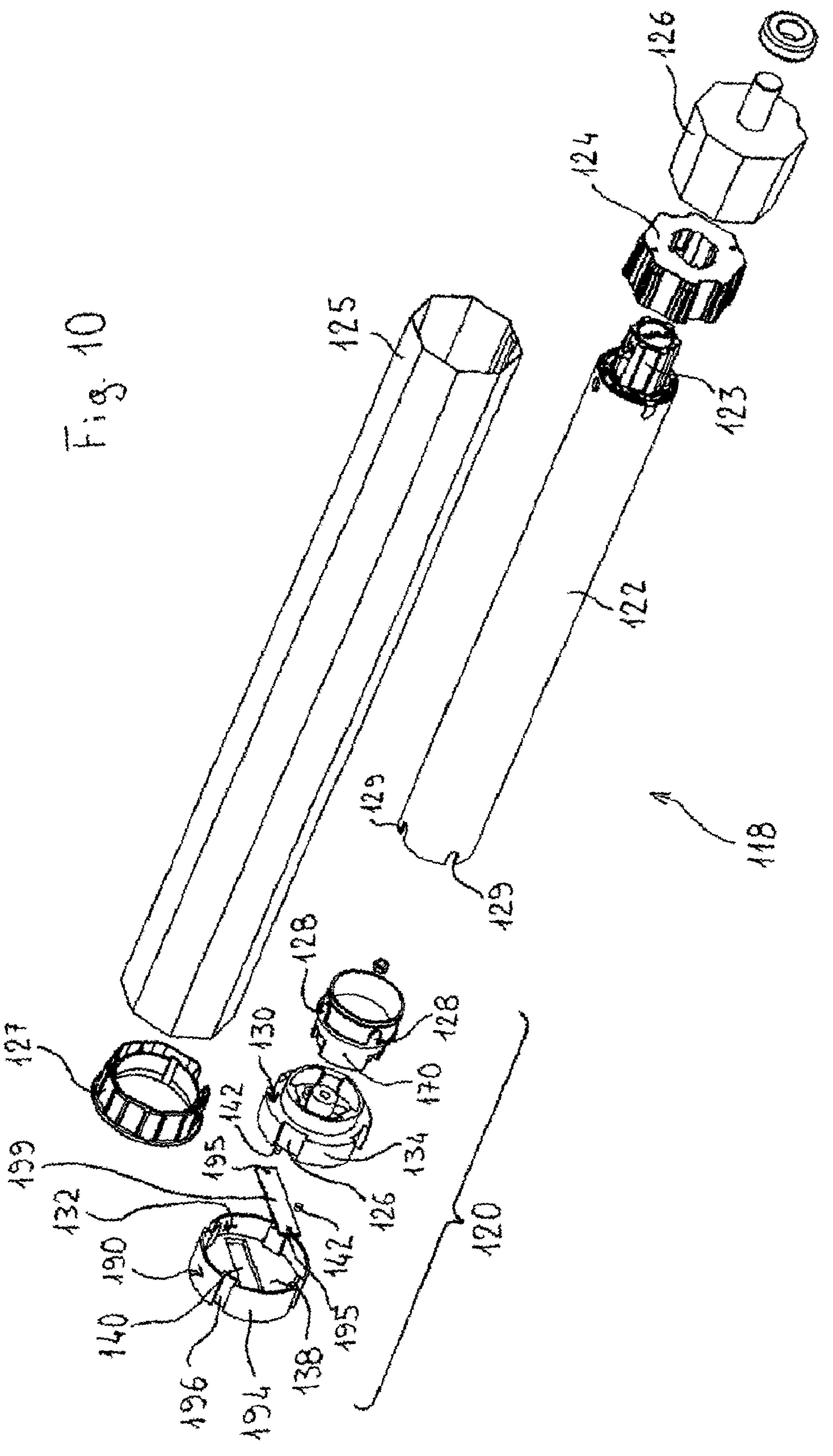
FIG. 10 is an exploded view of a second actuating system for roller blinds.

An actuating system, which comprises a second device according to the invention, is shown in FIG. 10 and is denoted by the number 118. It is composed of:

- a device for implementing the method according to the invention, associated with an end group 120;
- a tubular body 122 which:
- at one end contains a motor and all the devices for operation thereof (not shown), the output shaft of which is connected to a pinion 123 inserted inside a toothed adaptor 124 for a roller 125 (on which the roller blind—not shown—is wound), said roller being arranged over the tubular body 22 in a coaxial position;
- at the other end is joined to connector 170 by means of forced engagement between reliefs 128 on the connector 170 and corresponding recesses 129 of the tubular body 122;
- a prism-shaped support body 126 which is fixed rotatably to a wall and in which one end of the roller 125 is engaged, a metal ring 127 being inserted inside the other end of the roller 125.

Figure 11:
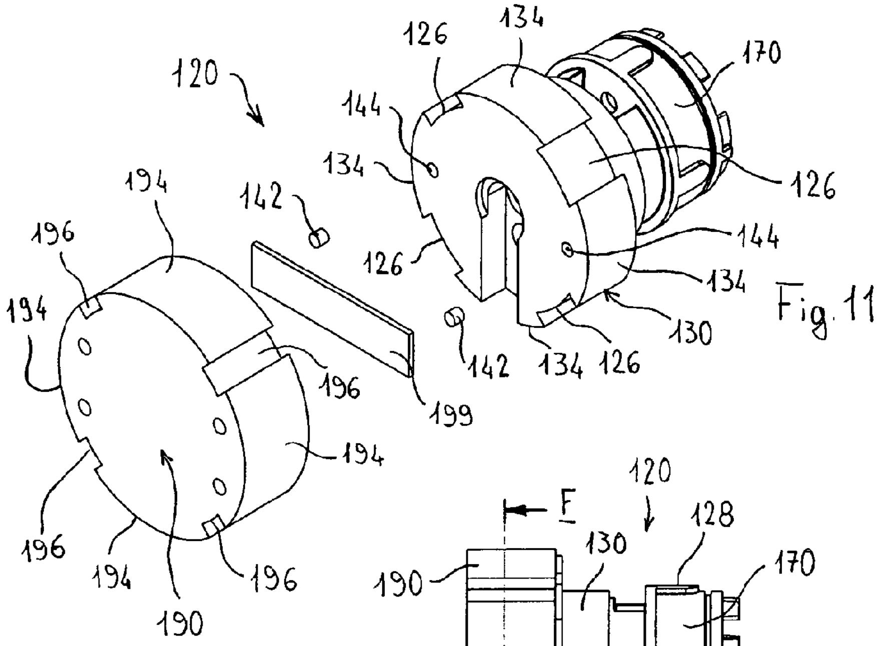
FIG. 11 is an exploded view of a second device according to the invention.
Figure 12:
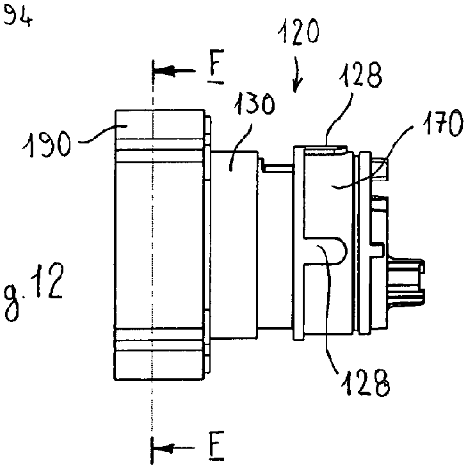
FIG. 12 is a side view of one end of the actuating system according to FIG. 10.

The end group 120 has been shown separately and in greater detail in FIGS. 11 and 12. It comprises a base piece 130, the connector 170 and a wall bracket 190. The latter is fixed to a wall and the base piece 130 is housed inside it. The tubular body 122 is inserted inside the roller 125 of the roller blind.

Figure 15:
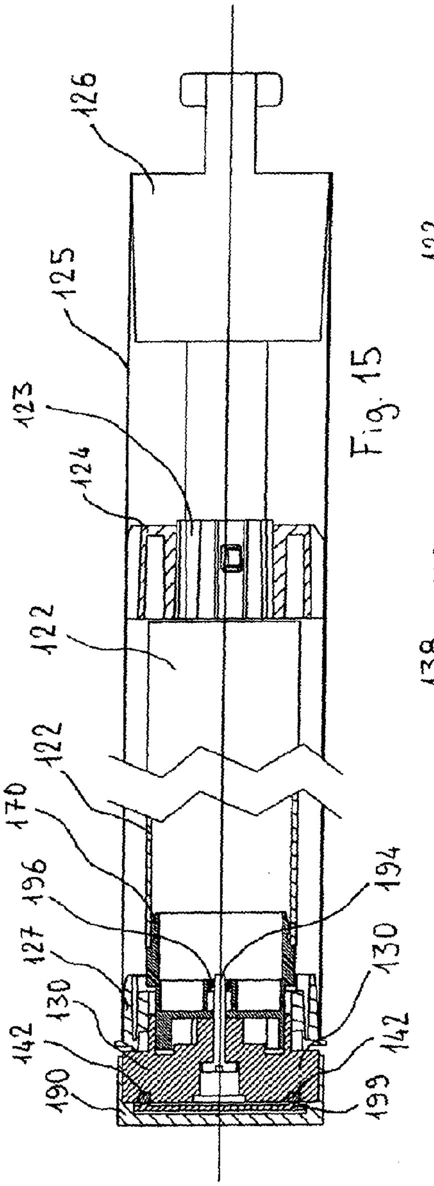
FIG. 15 is a vertically and longitudinally cross-sectioned view of the actuating system according to FIG. 10.
Figure 16:
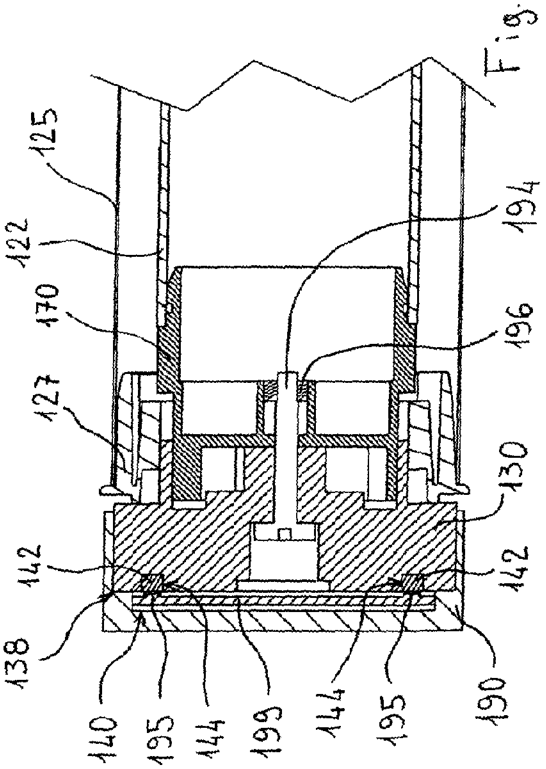
FIG. 16 is a view of a detail according to FIG. 15.

The base piece 130—see FIGS. 15 and 16—is joined to the connector 170 by means of a through-screw 194 which is tightened by a nut 196 and passes through these two parts.

Figure 13:
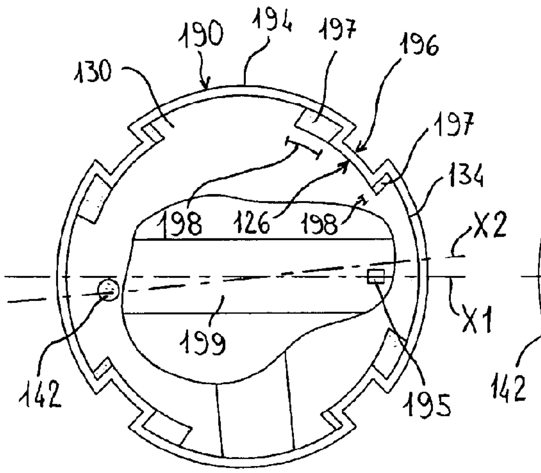
FIG. 13 is a cross-sectional view along the plane F-F of FIG. 12 in a first operating condition.
Figure 14:
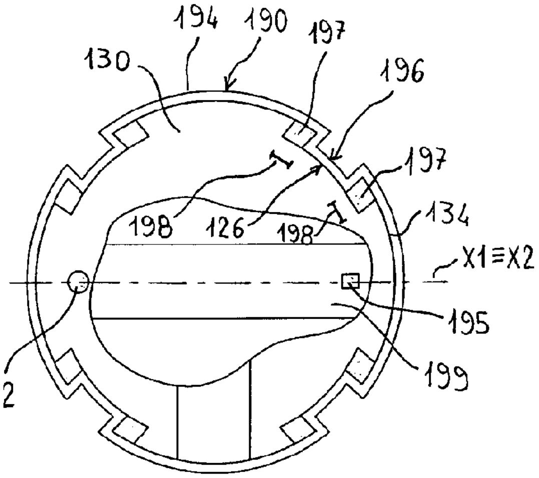
FIG. 14 is a cross-sectional view along the plane F-F of FIG. 12 in a second operating condition.

The base piece 130—see FIGS. 13 and 14, which for the sake of simplicity shows only some reference numbers—has a cross-section in the form of a cross with four equal rounded sides 134 which each have, between them, a zone 126 inset towards the centre and house a corresponding cavity 132 of the bracket 190 which follows the profile thereof. The cavity 132 also has a cross-section in the form of a cross with four equal rounded sides 194, between each of which there is a zone 196 inset towards the centre. The extension of the inset zones 196 extends along an arc which is smaller than that of the inset zones 126 and therefore a mutual rotational mechanical play 198 is obtained between the bracket 190 and the base piece 130 (which has the function of a rotating part). This rotational play 198 has an angular amplitude which is equal to the difference between the widths of the inset zones 126 and 196.

The base piece 130, when it enters into the bracket 190, touches the bottom of the cavity 132, which is denoted by 138. The bottom 138 is provided with a rectangular groove 140 inside which the electronic board 199 is housed; when the base piece 130 is inserted inside the cavity 132, two circular seats 144 in the base piece 130 containing two magnets 142 are arranged opposite the said board. The board 199 comprises a Hall sensor 195 which is situated opposite each magnet 142. It should be noted that the board is shown in very schematic form, but may contain all the logic components, the signal processing components and the connections necessary for the functions which will be described. Moreover, in order to increase the sensitivity of the system, the magnets 142 are directed so that a pole of their magnetic field is directed towards the sensors 195.

Advantageously—as in the device already described—it is possible to insert within the angular play 198 resilient means 197 so as to push resiliently the base piece 130 and therefore the connector 170 into a zero reference angular position. The comments made in this connection for the first device are also applicable in this case and will not be repeated.

Operation of the second device is now described with reference to FIGS. 10-16. The actuating system 118 comprises a kinematic chain consisting of the following components:

- the roller 125 is integral to the motor of the actuating system via the adaptor 124 and the pinion 123;
- the motor is integral to the tubular body 122 (being rigidly contained inside it) and the latter is integral to the connector 170 which is in turn integral to the base piece 130.

During rotation of the roller 125, the roller blind is wound onto or unwound from the roller 125. The moment exerted by the weight of the roller blind on the roller 125 therefore varies and is transmitted via the kinematic chain to the base piece 130, which assumes a certain angular position within the section of play 198. This position is the result of the action of the moment generated by the weight of the roller blind on the roller 125 and the opposing force of the resilient means 197 to which the moment of the motor is indirectly applied (the motor is controlled so as to rotate at a practically constant angular speed so as to move the roller blind at a constant speed).

If the roller blind encounters an obstacle and is stopped or in any case slowed down by it, the relative angular position deviation of the base piece 130 and the bracket 190 varies and the sensors 195 detect instantaneously this variation. This is explained with reference to FIGS. 13 and 14 where two different angular positions of the base piece 130 with respect to the bracket 190 are shown as an example. In the angular position of the connector 170 shown in FIG. 14, the two sensors 195 detect a strong magnetic field resulting from the proximity to the magnets 142. Two axes X1 and X2 which respectively pass through the two sensors 195 and the two magnets 142 are arranged on top of each other. When the rotating part (connector) 170 is rotated as shown in FIG. 13, where the axes X1 and X2 are inclined with respect to each other at a certain angle, the magnetic field in the space occupied by the sensors 195 is smaller, as is the signal output by the latter and analysed by the board 199. It is easy to understand that, in general, for each angle covered by the base piece 130 within the section 198, the magnetic field detected by the sensors 195, and therefore their output signal, will be different and uniquely linked to the angular position of the base piece 130 with respect to the bracket 190 (suitable screening systems—not shown—prevent any interference from outside the system).

The board 199 processes the signal of the sensors 195 so as to extract the information relating to the angular position of the base piece 130 within the section 198. At the same time, the board 199 may also acquire the current position of the roller blind (detected by means of devices of the known type, usually encoders, associated directly with the motor, inside the tubular body 122, or with the roller 125).

With the actuating system 118 it is possible to implement the same two control procedures indicated by i) and ii) (adjustable stepwise operation or acquisition of an RC for the angular position of the base piece 130, definition of a tolerance T, etc.) which were described for the actuating system 18, with the same advantages, and which will not be repeated here. In the same way it is possible to use for the actuating system 118 the constructional options already described for the actuating system 18.

Advantageously the safety device according to the invention may also be constructed separately from the actuating system, and therefore also as an external accessory, able to be added, if necessary, to an actuating system which is without one, with a considerable cost saving as regards both production and warehouse management.

Figure 17:
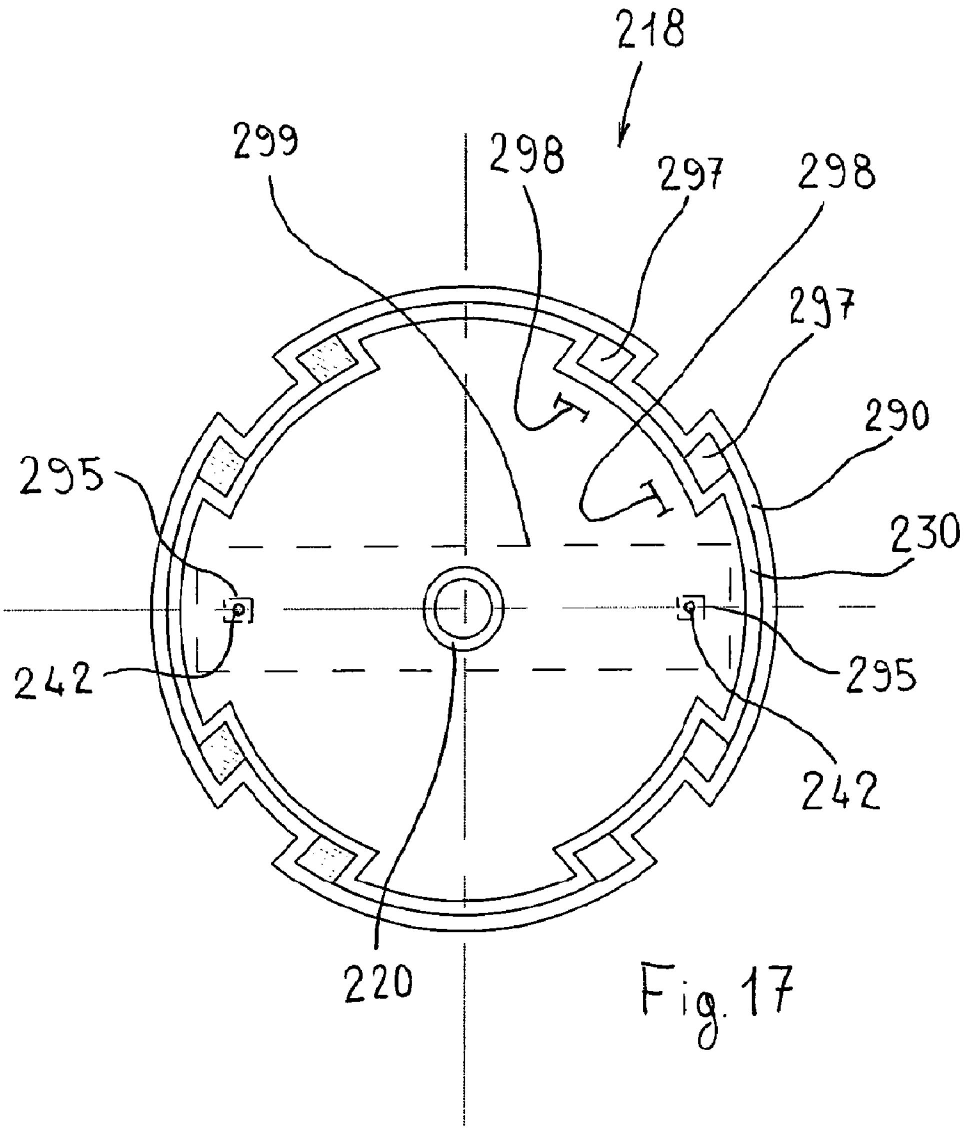
FIG. 17 is a cross-sectional view of an accessory according to the invention.
Figure 19:
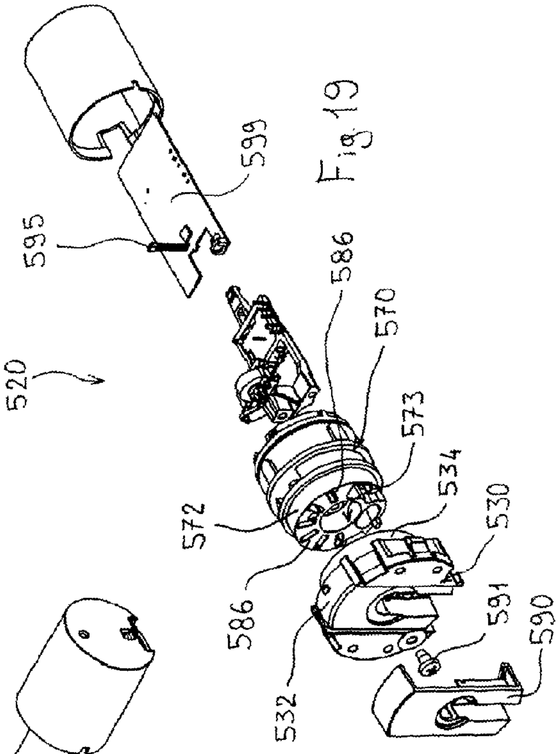
FIG. 19 is another exploded view of the device in FIG. 18.

An accessory of this type can be seen in FIG. 17 where it is shown in cross-section and denoted by 218. An electronic board 299 and sensors 295, which are fixed thereon, are inserted in a suitable seat formed in a fixed outer disk 290, to which an inner disk 230 is coaxially connected in a rotatable manner with a holed rivet 220. As can be seen, the cross-sections of the two disks 290, 230 have the same form as the bracket 190 and the base piece 130, respectively, and provide an identical degree of rotational mechanical play 298 with an angular amplitude equal to the difference between the widths of the perimetral inset zones on the two disks—as in the case of the actuating systems 18 and 118. The relative operation of the two disks 290, 230 is identical to that of the bracket 190 and the base piece 130 in the actuating system 118 and the base piece 30 and the rotating part 70 in the actuating system 18: the angular position of the inner disk 230 with respect to the outer disk is detected by means of the two sensors 295 which are situated on the outer disk and which detect the magnetic field of two magnets 242 situated on the inner disk opposite the sensors 295. Between the two disks 290, 230 it is possible to arrange resilient means 297, with the same aims described above for the means 97 and 197.

The functional properties, the advantages and the constructional possibilities for the accessory 218 are the same as for the two actuating systems 18 and 118 already described, and for the sake of brevity are not repeated. It is obvious that, in order to achieve anti-obstacle control of the roller blind in an actuating system which is without the safety device according to the invention, it is sufficient to install the accessory 218, using it in place of the wall bracket of the actuating system. The actuating system must be fixed to the inner disk 230, while the outer disk 290 is fixed to the wall. The accessory may comprise only the outer disk 290 with the board 299 integrated, without inner disk 230, in place of which the end group of the actuating system to be controlled is inserted in the disk 290. Magnets are mounted on the end group of the actuating system so that they are able to interact with the sensors of the board present in the outer disk.

Moreover, the board 299 may also be absent, being arranged either in a remote position or already equipping the actuating system, which may be enabled and/or re-programmed to manage the signal supplied by the accessory.

For the devices already described another applicational possibility is that of installing them with a pre-set RC and T, for example in the case of very standardized applications. As an unrestrained connection, in addition to the play as described, it is possible to employ other connection systems, for example the play between one gear and another or a rack, or linear play and not angular play as in the embodiments described, or a combination of the two. Moreover, the barrier may be directly connected to the rotating part, without the intermediate arrangement of a kinematic chain as described; a possible example would be a driving crown wheel which meshes with play in a rack arranged longitudinally and joined to a gate so as to move it backwards and forwards.

Even the play resulting from the assembly or manufacturing tolerances may be exploited with the invention. In precision applications or when desirable, it is also possible to consider a zero tolerance, i.e. T=0. Another variant relates to the form of the parts which define the angular play, from their shape to the number of projections/inset zones for defining the angular play, or the arrangement of the latter (on the fixed part or the rotating part). Another variant relates to the number of magnets and magnetic field sensors, or their arrangement. Another variant relates to the design of the control system for the actuating system: here a digital control system has been described, but it is also possible to use any similar signal processing and storage technology.

Figure 18:
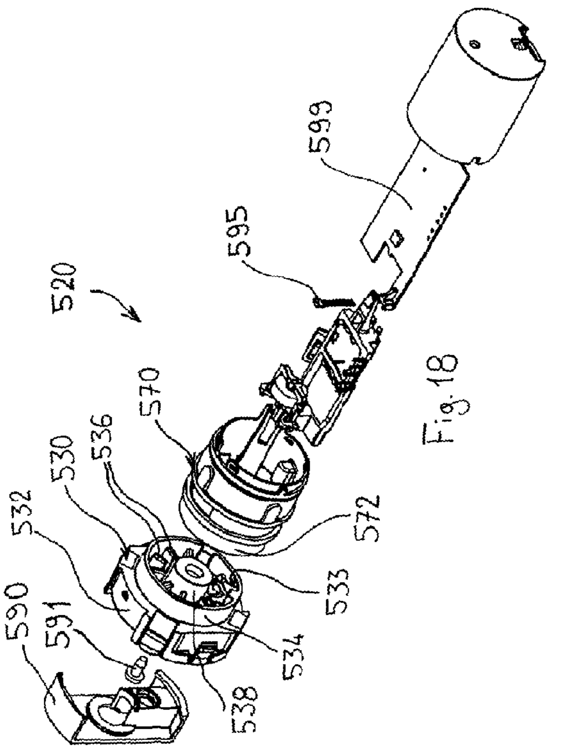
FIG. 18 is an exploded view of a third device according to the invention for an actuating system for roller blinds.
Figure 21:
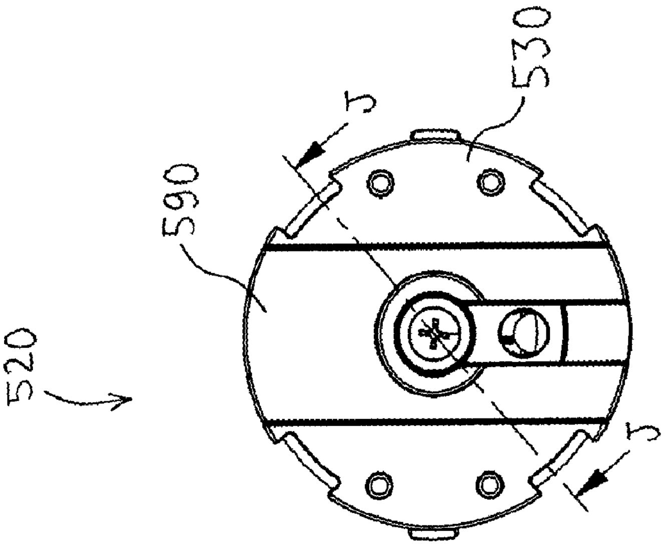
FIG. 21 is a front view of the device in FIG. 18 when assembled.
Figure 20:
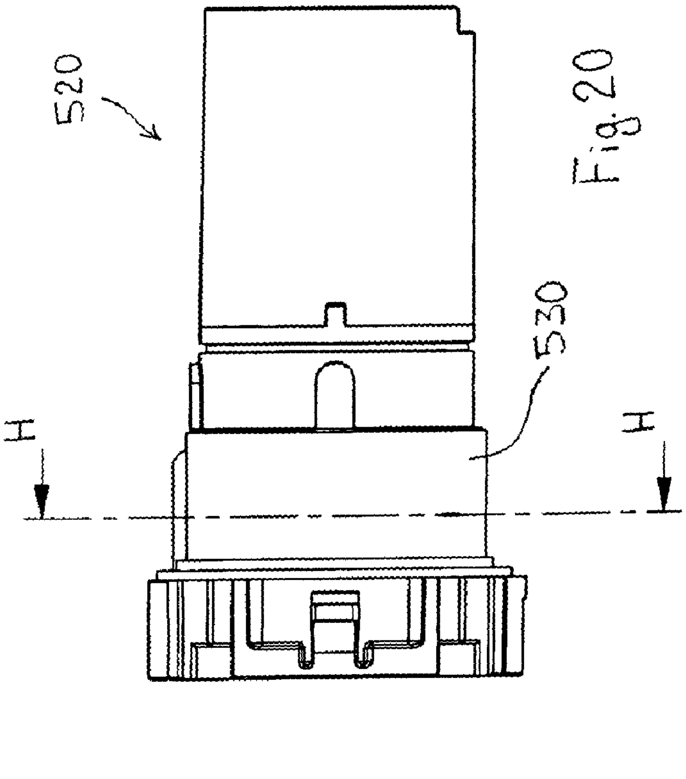
FIG. 20 is a side view of the device in FIG. 18 when assembled.
Figure 22:
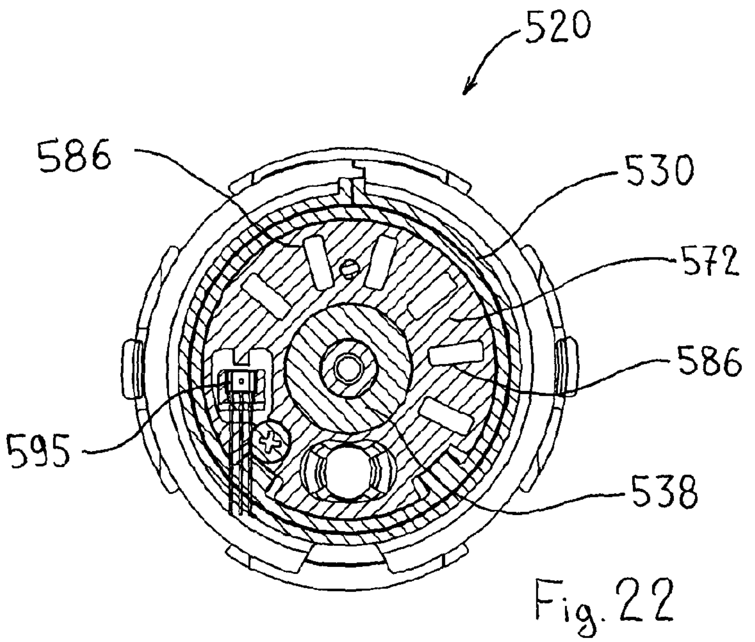
FIG. 22 is a cross-sectional view along the plane H-H indicated in FIG. 20.
Figure 23:
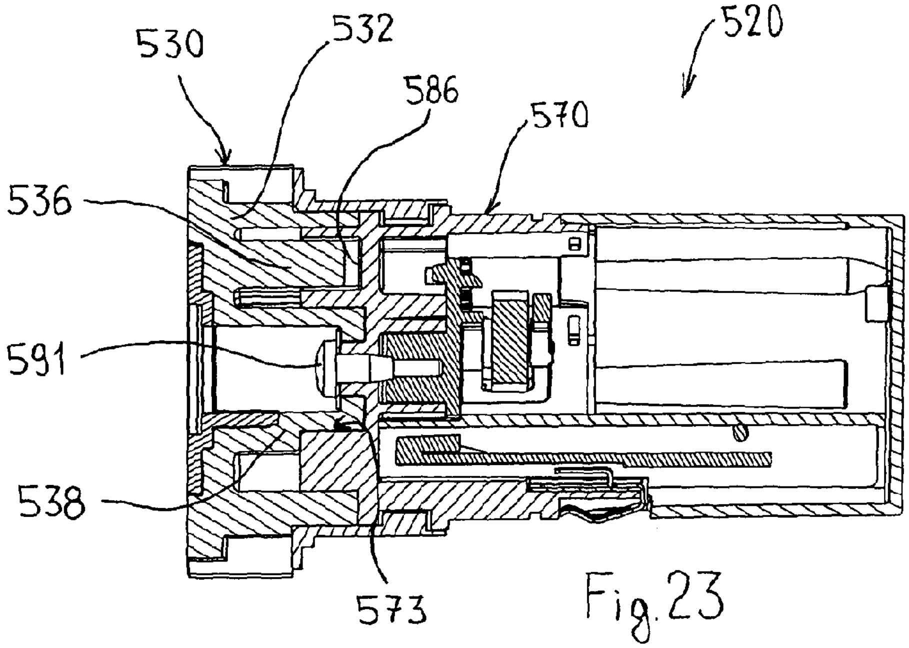
FIG. 23 is a cross-sectional view along the plane J-J indicated in FIG. 21.

A third device according to the invention is shown in FIG. 18 and the following. It comprises a head (or end group) 520, while the other components of the actuating device which are not shown are similar to those previously described for the systems 18 and 118, thus for sake of conciseness they are omitted.

The head 520 comprises, as before, a base piece 530 and a rotating part 570 substantially with a circular cross-section, an electronic circuit board 599 with sensors 595 (both functionally identical to those previously described) and a wall bracket 590. The latter is fixed to a wall and the base piece 530 is joined to it. As before, the base piece 530 acts as a fixed base on which the rotating part 570 is able to rotate over a limited section of angular travel. The head 520, for which all the technical considerations and ways of working described for the systems 18 and 118 still apply, differs from the preceding systems for the embodiment of the resilient means between the rotating part 570 and the base piece 530.

Only these resilient means and related elements will be now described, for brevity. The rest of the system is similar to that of the other variants.

The base piece 530 comprises a cylindrical base 532 from which there projects a circular lip 534 which has, on the inside, in a cavity 533, a set of identical flexible fins 536 (only some numerated), of rectangular section, which are situated in a radial arrangement, with respect to the centre of the lip 534 where there is a hollow cylindrical relief 538 which is as high as the lip 532.

With a screw 591 tightened by a nut (not shown) which passes inside the relief 538, the base piece 530 is rotatably connected to the rotating part 570 which also has a circular lip 572, but with a diameter smaller than the lip 534 so as to be able to fit perfectly inside it and rotate with frictionless contact.

The lip 572 is provided with a set of identical slits 586 (only some numerated), of rectangular shape, which are situated in a radial arrangement, with respect to the centre of the lip 534 where there is a cylindrical cavity 573. The radial arrangement and dimensions of the slits 586 corresponds to that of the fins 536, such that each of the fins 536 can be inserted in a corresponding slit 586, optionally with a little play, when the rotating part 570 is inserted in the base piece 530 (the relief 538 is mounted inside the cavity 573).

The play of the relative rotation of the part 570 in respect of the base piece 530 can be determined by two factors. First, an optional mutual mechanical play between the fins 536 and the slits 586 (the former being smaller than the latter and moving therein) and, second, the flexibility of the fins 536. With or without play, when the part 570, subject to torsion, rotates enough in respect of the base piece 530 the fins 536 begin to flex. This flexion has two effects: (i) it defines a mechanical play between the part 570 and the base piece 530, and (ii) it provides a counter-force, able to withstand an excessive torsion of the part 570 and able to resiliently move the part 570 back in its original angular position when the torsion thereon zeroes.

Clearly, the shape and the material of the fins 536 are reliably chosen to over-resist the maximum expected torsion while providing at the same time the desired elastic response. The number of the fins 536 and the slits 586 can be variable, from one to a multiplicity. Another variant is possible, wherein the fins 536 are not flexible and/or resilient means, such as those previously described, are provided in the slits 586 to exert a force on the fins 536 against the torsion thereof.

It is understood that minor deviations from the inventive idea expressed by the above description and accompanying drawings are nevertheless included within the scope of protection of the following claims.

The invention claimed is:

1. A safety device for a movable barrier to stop or initiate a reversing movement during closing or opening of the barrier, the barrier being actuated by a motor and being movable along an operational travel path, the device comprising:

a first and a second part, the second part rotatably connected to the first part and being rotatable relative to the first part along a rotational travel path limited to less than 360 degrees, the first part being fixed relative to a movement of the movable barrier, the second part being joined to the motor of the movable barrier and being independently rotatable with respect to the action of the motor of the movable barrier;

a detecting means for detecting along the rotational travel path the relative position of first and second parts;

a processing unit for processing data detected by the detecting means and for generating position data defining a positional relationship between the first and second parts that correlate to position of the movable barrier along the operational travel path, the processing unit being able to utilize the generated position data for controlling the motor when the generated position data indicates a position of the movable barrier along the operational travel path exceeding a predetermined safety position;

wherein the first part comprises a cavity, the second part being kinematically connected to the movable barrier and coaxially connected with rotational movement to the first part in the cavity.

2. The safety device of claim 1, further comprising a recording means, the recording means being connected to the detection means for determining reference position data during a test closing of the barrier.

3. The safety device of claim 2, wherein the reference position data comprises the predetermined safety position.

4. The safety device of claim 3, wherein the recording means comprises a memory for recording the predetermined safety position.

5. The safety device of claim 1, wherein the processing unit controls the motor only when the generated position data indicates the position of the barrier exceeds the predetermined safety positions.

6. The safety device of claim 1, wherein the barrier comprises a roller blind connected to the first part.

7. The safety device of claim 6, wherein the roller blind forms part of a kinematic chain that connects the roller blind to the first part.

8. The safety device of claim 6, further comprising a transmission means and a remote receiver, the transmission means for transmitting and the remote receiver for receiving the position data and predetermined safety position data during operation of the barrier.

9. The safety device of claim 8, wherein the transmission means is a wireless transmission means.

10. The safety device of claim 1, wherein the first part comprises a radial projection and the second part comprises an inset surface area for rotational movement of the first and second part relative to each other; or wherein the second part comprises a radial projection and the first part comprises an inset surface area for rotational movement of the first and second part relative to each other.

11. The safety device of claim 1, wherein the first part comprises an inner circular edge interrupted by a plurality of teeth, the teeth extending radially from the inner circular edge; and the second part comprises an outer circular edge interrupted by a plurality of receiving portions, each receiving portion receiving a respective tooth of the plurality of teeth;

the outer circular edge comprising a diameter smaller than a diameter of the inner circular edge;

each of the receiving portions being sized larger than the respective tooth to permit movement of the tooth in the receiving portion for rotation of the first and second part relative to each other.

12. The safety device of claim 1, wherein the first part comprises an inner circular edge interrupted by a plurality of fins, the fins extending radially from the inner circular edge; and the second part comprises an outer circular edge and a plurality of slits, each slit receiving a respective fin of the plurality of fins;

the outer circular edge comprises a diameter smaller than a diameter of the inner circular edge; and each of the slits being sized larger than the respective fin to permit movement of the fin in the slit for rotation of the first and second part relative to each other; or wherein the second part comprises an outer circular edge interrupted by a plurality of fins, the fins extending radially from the outer circular edge;

the first part comprises an inner circular edge interrupted by a plurality of slits, each slit receiving a respective fin of the plurality of fins; and the outer circular edge comprises a diameter smaller than a diameter of the inner circular edge; and each of the slits being sized larger than the respective fin to permit movement of the fin in the slit for rotation of the first and second part relative to each other.

13. The safety device of claim 12, wherein the plurality of fins are flexible such that when the fins are subject to torsion, the first and second parts rotate with respect to each other to act as a counterforce to withstand an excessive torsion and to resiliently move the second part back to its original position when the torsion zeroes.

14. The safety device of claim 13, wherein each of the slits comprise a resilient means to exert a force on each of the fins against the torsion.

15. The safety device of claim 12, wherein the fins are mounted with play in the respective slits.

16. The safety device of claim 1, wherein the detection means comprises a magnet arranged on the first part and a magnetic field sensor on the second part; or wherein the detection means comprises a magnet arranged on the second part and a magnetic field sensor on the first part.

17. The safety device of claim 1, further comprising a recording means comprising a sampling device.

18. A safety device for a movable barrier to stop or initiate a reversing movement during closing or opening of the barrier, the barrier being actuated by a motor and being movable along an operational travel path, the device comprising:

a first and a second part, the second part rotatably connected to the first part and being rotatable relative to the first part along a rotational travel path limited to less than 360 degrees, the first part being fixed relative to a movement of the movable barrier, the second part being joined to the motor of the movable barrier and being independently rotatable with respect to the action of the motor of the movable barrier, a detecting means for detecting along the rotational travel path the relative position of first and second parts;

a processing unit for processing data detected by the detecting means and for generating position data defining a positional relationship between the first and second parts that correlate to position of the movable barrier along the operational travel path, the processing unit being able to utilize the generated position data for controlling the motor when the generated position data indicates a position of the movable barrier along the operational travel path exceeding a predetermined safety position; and a resilient means disposed in the travel path to resiliently rotate the first and second part so that the barrier is in a position that does not exceed the safety position.

19. A method for providing a safety device for a movable barrier to stop or initiate a reversing movement during closing or opening of the barrier, the barrier being actuated by a motor and being movable along an operational travel path; the method comprising the steps of:

(a) connecting a first and a second part such that the first and second part are rotatably connected to each other, the second part being rotatable relative to the first part along a rotational travel path limited to less than 360 degrees; the first part being fixed relative to a movement of the movable barrier; the second part being joined to the motor of the movable barrier and being independently rotatable with respect to the action of the motor of the movable barrier;

(b) using a detecting means detecting along the rotational travel path the relative position of the first and second parts;

(c) processing by means of a processing unit data detected by the detecting means for generating position data defining a positional relationship between the first and second parts that correlate a position of the movable barrier along the operational travel path;

(d) utilizing the position data for controlling the motor when the position data indicates the position of the barrier along the operational travel path exceeding a predetermined safety position using a processing unit;

wherein a resilient means is disposed in the travel path to resiliently rotate the first and second part so that the barrier is in a position that does not exceed the safety position.

20. The method of claim 19, further comprising the step of determining reference position data during a test closing of the barrier and using a recording means connected to the detection means for recording the reference position data.

21. The method of claim 20, wherein a comparison is performed with position data obtained during the test closure.

22. The method of claim 20, further comprising the step of transmitting position data to remote control receiver.

23. The method of claim 22, further comprising the step of transmitting wirelessly.

24. The method of claim 19, wherein the barrier is a roller blind wound onto a roller that is connected to the first support with play.

25. A method for providing a safety device for a movable barrier to stop or initiate a reversing movement during closing or opening of the barrier, the barrier being actuated by a motor and being movable along an operational travel path; the method comprising the steps of:

(a) connecting a first and a second part such that the first and second part are rotatably connected to each other, the second part being rotatable relative to the first part along a rotational travel path limited to less than 360 degrees; the first part being fixed relative to a movement of the movable barrier; the second part being joined to the motor of the movable barrier and being independently rotatable with respect to the action of the motor of the movable barrier;

(b) using a detecting means detecting along the rotational travel path the relative position of the first and second parts;

(c) processing by means of a processing unit data detected by the detecting means for generating position data defining a positional relationship between the first and second parts that correlate a position of the movable barrier along the operational travel path;

(d) utilizing the position data for controlling the motor when the position data indicates the position of the barrier along the operational travel path exceeding a predetermined safety position using a processing unit;

(e) determining reference position data during a test closing of the barrier and using a recording means connected to the detection means for recording the reference position data; and (f) defining for the comparison at least one activation tolerance value beyond which only the action of the motor and/or the movement of the barrier is prevented.

* * * * *